(12) United States Patent
Shingne et al.

(10) Patent No.: US 10,588,405 B1
(45) Date of Patent: Mar. 17, 2020

(54) ARTICULATED HANGER MECHANISM

(71) Applicant: B/E Aerospace, Inc., Winston-Salem, NC (US)

(72) Inventors: Umesh B. Shingne, Hyderabad (IN); Ian L. Frost, Winston-Salem, NC (US); Deepak Chandra Kokkalla, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/451,653

(22) Filed: Jun. 25, 2019

(51) Int. Cl.
*A47B 61/02* (2006.01)
*B64D 11/00* (2006.01)

(52) U.S. Cl.
CPC ............ *A47B 61/02* (2013.01); *B64D 11/003* (2013.01)

(58) Field of Classification Search
CPC ........ A47B 61/02; A47B 61/00; A47G 25/40; A47G 25/4015; A47G 25/4023; A47G 25/4038; B64D 11/003
See application file for complete search history.

(56) References Cited

U.S. PATENT DOCUMENTS

| | | | |
|---|---|---|---|
| 2,469,143 A * | 5/1949 | Ascherl .................. | A47B 61/02 312/224 |
| 2,702,734 A * | 2/1955 | Kroll ...................... | A47B 61/02 312/275 |
| 2,960,236 A | 11/1960 | Prenveille | |
| 3,417,874 A * | 12/1968 | Bryant .................... | A47B 61/02 211/100 |
| 3,606,711 A | 9/1971 | Lodato | |
| 4,252,242 A * | 2/1981 | Tudor .................... | A47B 61/02 211/104 |
| 4,632,255 A | 12/1986 | Kennedy | |
| 5,507,423 A | 4/1996 | Fischer et al. | |
| 7,806,280 B1 * | 10/2010 | Perkins .............. | A47G 25/0685 211/100 |
| 8,540,087 B1 * | 9/2013 | Skaer ................. | A47G 25/0685 211/100 |
| 10,065,565 B2 | 9/2018 | Mozurkewich et al. | |
| 2004/0070318 A1 * | 4/2004 | Shai ....................... | A47B 61/06 312/205 |
| 2013/0264362 A1 * | 10/2013 | Watanabe .......... | A47G 25/4023 223/85 |
| 2019/0038059 A1 * | 2/2019 | Baltz .................... | A47G 25/442 |

* cited by examiner

*Primary Examiner* — Daniel J Rohrhoff
(74) *Attorney, Agent, or Firm* — Clements Bernard Walker

(57) ABSTRACT

A wardrobe includes a rear wall, a sidewall, and a door pivotally attached to the sidewall defining an enclosure. An articulating hanger mechanism includes a support arm pivotally attached to the sidewall, and a link device pivotally attached to the door and to the support arm. Hanger arms pivotally attached to the support arm have stowed positions at which they extend along two opposite sides of the support arm. Coupling links are pivotally attached to the hanger arms for pivoting the hanger arms from the stowed positions to deployed positions at which the hanger arms extend outward from the support arm to support a garment. Upon user action pivoting the door from the closed position, the link device automatically pivots the support arm outward from the enclosure and the coupling links pivot the hanger arms from the stowed positions to the deployed positions.

20 Claims, 4 Drawing Sheets

ARTICULATED HANGER MECHANISM

BACKGROUND

Airline operators offer increasingly convenient and flexible cabin amenities for passenger use and comfort. Passengers often wear layers of clothing articles as they travel, in many circumstances from one weather condition at a departure location or country to another entirely different weather condition at a destination location or country. Whether or not outdoor conditions are a concern, business travelers for example often wear outer suit coats, blazers, and jackets. Business travelers are particularly concerned with presentable appearances, for example as they travel to attend meetings, and may be greeted by associates, clients, or competitors even as they emerge from an aircraft without time to visit a residence, hotel, or other accommodations for a change of attire or pressing or other treatment of the clothing worn or carried in flight. Airline employees alike are expected to have professional and fresh appearances before, during, and after flights.

As passengers and employees come and go in an airline cabin environment, they may be carrying multiple luggage items and are increasingly at once connecting by phone, text, or even video with family or business associates. Thus, not only are boarding and exiting planes rushed for economical purposes, most people are multi-tasking as they enter and exit planes. Accommodations for clothing and personal items are preferably then conveniently used and increasingly are expected to offer some degree of automation.

While access to effects such as clothing hangers is expected on need or demand, such effects are also expected to stow for convenience when not in use, particularly given the limited space in passenger cabins even in premium suite accommodations.

Improvements are needed in garment hanging devices. Improvements are needed in automatically deploying hangers operable by one hand without likelihood of hangers being dropped or misplaced. Improvements are needed by which garment hangers are stowed from sight when not in use.

SUMMARY OF THE INVENTIVE ASPECTS

To achieve the foregoing and other advantages, the inventive aspects disclosed herein are directed to an articulating hanger mechanism including a support arm pivotally attachable at a first end thereof to a first structure, such as a wardrobe. At least one link device is pivotally attached to the support arm and attachable to a second structure, such as a door of the wardrobe, the second structure pivotally connected to the first structure and defining therewith an enclosure in a closed position of the second structure relative to the first structure. First and second hanger arms are pivotally attached to a second end of the support arm, the first and second hanger arms having stowed positions at which the first and second hanger arms extend toward the first end of the support arm along two opposite sides thereof. First and second coupling links are pivotally attached to the first and second hanger arms respectively for pivoting the first and second hanger arms from the stowed positions thereof to deployed positions at which the first and second hanger arms extend outward from the two opposite sides of the support arm to support a garment. Upon user action pivoting the second structure from the closed position thereof, the link device automatically pivots the support arm outward from the enclosure and the first and second coupling links pivot the first and second hanger arms from the stowed positions thereof to the deployed positions thereof.

In some embodiments, upon user action pivoting the second structure from an open position to the closed position thereof, the support arm automatically pivots into the enclosure and the first and second coupling links pivot the first and second hanger arms from the deployed positions thereof to the stowed positions thereof.

In some embodiments, a second link device is pivotally attached to the support arm and attachable to the first structure, wherein the at least one link device and second link device are pivotally attached to opposite lateral sides of the support arm.

In some embodiments, the first and second coupling links are pivotally attached to a transfer link that is slidably coupled to the support arm such that, as the link device pivots the support arm outward, the transfer link automatically translates along the support arm thereby actuating the first and second coupling links to pivot the first and second hanger arms from the stowed positions thereof to the deployed positions thereof.

In some embodiments, as the link device pivots the support arm outward, the transfer link automatically translates in a first direction along the support arm. Upon user action pivoting the second structure from an open position to the closed position thereof: the support arm automatically pivots into the enclosure; and the transfer link automatically translates in a second direction, opposite the first direction, along the support arm thereby actuating the first and second coupling links to pivot the first and second hanger arms from the deployed positions thereof to the stowed positions thereof.

In some embodiments, a drive link has a first end pivotally attachable to the first structure and a second end pivotally attached to the transfer link, wherein, upon user action pivoting the second structure from the closed position thereof, the drive link automatically pulls the transfer link to translate along the support arm.

In some embodiments, a support bracket is attachable to the first structure, wherein the support arm is pivotally attached at the first end thereof to the support bracket, and, the first end of the drive link is pivotally attached to the support bracket.

In some embodiments, the first end of the support arm is pivotally attached to the support bracket at a pivot point spaced from a pivot point at which the first end of the drive link is pivotally attached to the support bracket.

In some embodiments, the first and second hanger arms pivot at different rates of angular rotation relative to the support arm as the support arm pivots.

In some embodiments, first and second coupling links have fixed different lengths thereby pivoting the first and second hanger arms at the different rates of angular rotation relative to the support arm as the support arm pivots.

The inventive aspects disclosed herein are also directed to a wardrobe including a cabinet having at least a rear wall and a sidewall. A door is pivotally attached to the sidewall and defines, with at least the sidewall and rear wall, an enclosure in a closed position of the door. An articulating hanger mechanism includes a support arm pivotally attached at a first end thereof to the sidewall. At least one link device has a first end pivotally attached to the door and a second end pivotally attached to the support arm. First and second hanger arms are pivotally attached to a second end of the support arm, the first and second hanger arms having stowed positions at which the first and second hanger arms extend toward the first end of the support arm along two opposite sides thereof. First and second coupling links are pivotally attached to the first and second hanger arms respectively for pivoting the first and second hanger arms from the stowed positions thereof to deployed positions at which the first and second hanger arms extend outward from the two opposite sides of the support arm to support a garment. Upon user action pivoting the door from the closed position thereof, the link device automatically pivots the support arm outward from the enclosure and the first and second coupling links pivot the first and second hanger arms from the stowed positions thereof to the deployed positions thereof.

In some embodiments, upon user action pivoting the door from an open position to the closed position thereof, the support arm automatically pivots into the enclosure and the first and second coupling links pivot the first and second hanger arms from the deployed positions thereof to the stowed positions thereof.

In some embodiments, a second link device has a first end pivotally attached to the rear wall and a second end pivotally attached to the support arm, wherein the second ends of the at least one link device and second link device are pivotally attached to opposite lateral sides of the support arm.

In some embodiments, a transfer link, to which the first and second coupling links are pivotally attached, is slidably coupled to the support arm such that, as the link device pivots the support arm outward, the transfer link automatically translates along the support arm thereby actuating the first and second coupling links to pivot the first and second hanger arms from the stowed positions thereof to the deployed positions thereof.

In some embodiments, as the link device pivots the support arm outward, the transfer link automatically translates in a first direction along the support arm. Upon user action pivoting the door from an open position to the closed position thereof: the support arm automatically pivots into the enclosure; and the transfer link automatically translates in a second direction, opposite the first direction, along the support arm thereby actuating the first and second coupling links to pivot the first and second hanger arms from the deployed positions thereof to the stowed positions thereof.

In some embodiments, a drive link has a first end pivotally attached to the sidewall and a second end pivotally attached to the transfer link. Upon user action pivoting the door from the closed position thereof, the drive link automatically pulls the transfer link to translate along the support arm.

In some embodiments, a support bracket is attached to the sidewall, the support arm is pivotally attached at the first end thereof to the support bracket, and, the first end of the drive link is pivotally attached to the support bracket.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

An articulating hanger mechanism is provided for use in a passenger suite for example where a hanger is wanted at times for hanging garments, such as coats, and clear space in the passenger suite is preferred at other times. The articulating hanger mechanism accordingly can be stowed behind a closed door and automatically deployed by opening of the door. The hanger mechanism has two hanger arms that unfold from their stowed positions to a ready-for-use deployed configuration in which the arms together present a passenger with a hanger in a familiar form offset from walls of the passenger suite. Articulating movements of the hanger arms and other components of the mechanism are predetermined to avoid contact with the door and rear wall of an enclosure in which the hanger mechanism is hidden in the stowed configuration.

Figure 1A:
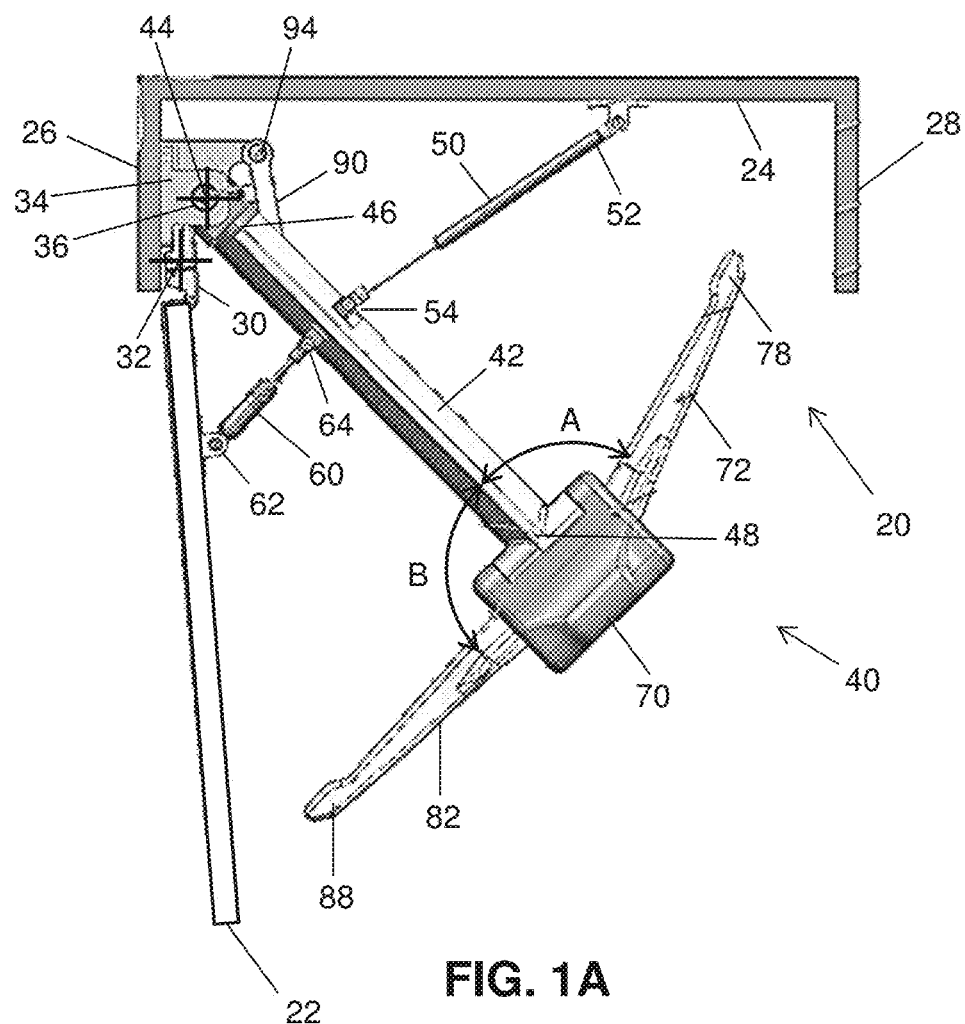
FIG. 1A is an overhead view of a hanger mechanism, according to the present disclosure, shown in a deployed condition for use.
Figure 1B:
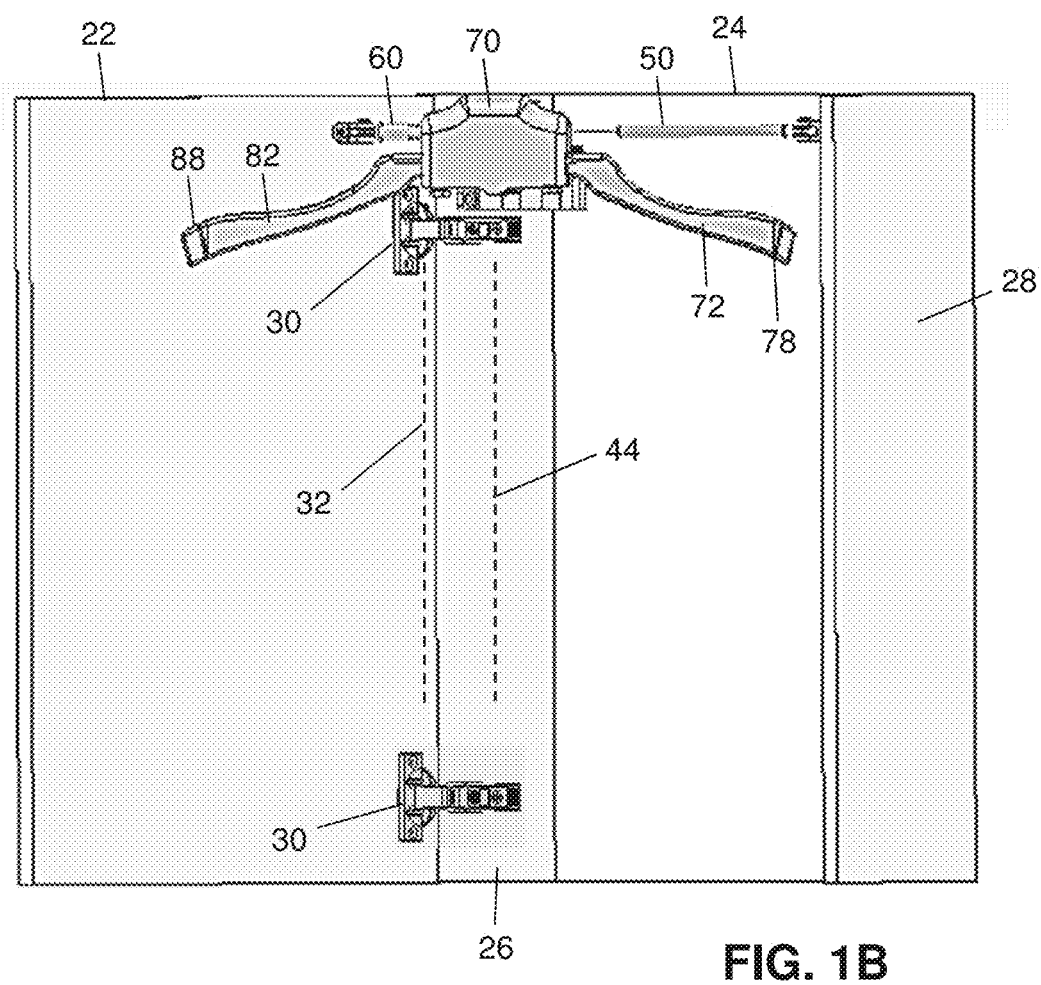
FIG. 1B is an elevation view of the hanger mechanism in the deployed condition of FIG. 1A.

A non-limiting example of an articulating hanger mechanism is shown in FIG. 1A in a deployed condition for use. The hanger mechanism is illustrated as installed in a first structure, referenced as a cabinet 20 such as that of a wardrobe, closet, etc. The hanger mechanism automatically deploys when second structure, referenced as a cabinet door 22, opened, for example by user action. The hanger mechanism automatically stows when the door is closed, for example by user action. The cabinet includes a fixed panel 24 serving as a rear wall, a first sidewall 26, and a second sidewall 28 opposite the first sidewall, together defining an enclosure with the door 22 upon closure of the door 22. In the illustrated embodiment, the door 22 is pivotally attached to the first sidewall 26 by stationary hinges 30 that define a first vertical pivot axis 32 (FIG. 1B) about which the door 22 pivots from a closed position (FIG. 2), to an open position (FIGS. 1A-1B).

The hanger mechanism, referenced generally as 40 throughout the drawings, includes a pivoting cantilever support arm 42 pivotally attached to the first sidewall 26 of the cabinet by a stationary support bracket 34 attached to the first sidewall 26. The linear support arm 42 and door 22 have offset pivot axes to accommodate their movements during deployment and stowing actions. The generally linear and horizontal support arm 42 pivots around a second vertical pivot axis 44 (FIG. 1B), and the door 22 pivots around the first vertical pivot axis 32 that is parallel to and spaced from the second vertical pivot axis 44. The pivot axes 32 and 44 are represented as crosshairs in the top view of FIG. 1A.

A first end 46 (FIG. 1A) of the support arm 42 is pivotally attached to a pivot point 36 of the support bracket 34, through which the second vertical pivot axis 44 is defined. A second end 48 of the support arm 42, opposite the first end 46, swings in a horizontal arc as the support arm 42 pivots from a stowed position (FIG. 2), to a deployed position (FIGS. 1A-1B).

Figure 2:
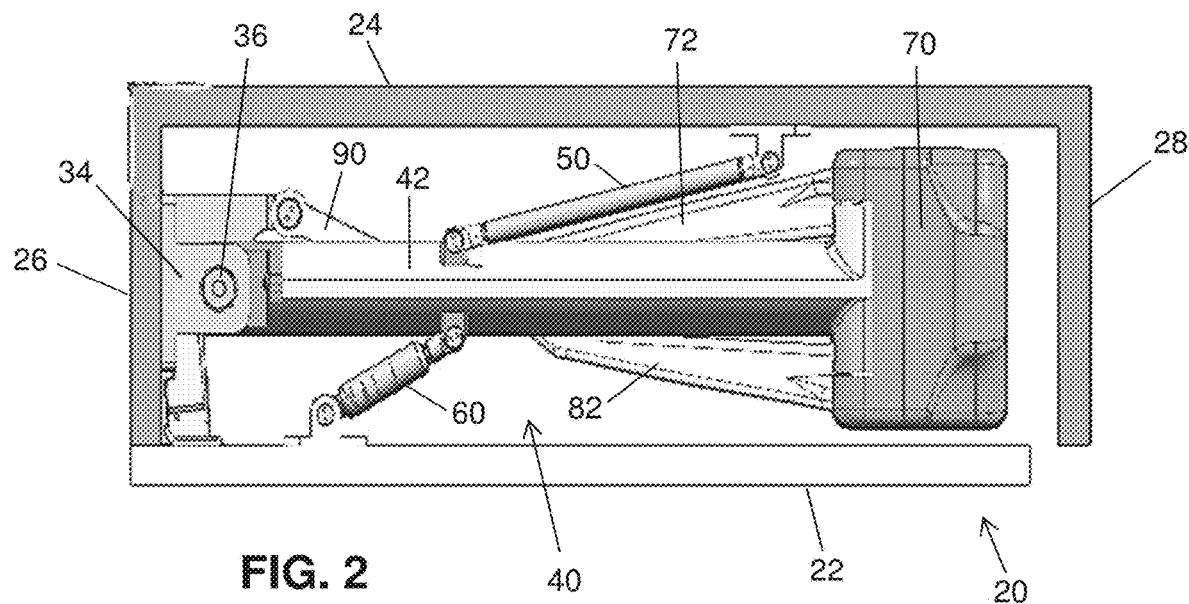
FIG. 2 is an overhead view of a hanger mechanism of FIG. 1A in a stowed condition.

Upon deployment, the support arm 42 is positioned angularly approximately midway between the open door 22 and the fixed panel 24 of the cabinet. The position of the support arm 42 between the fixed panel 24 and door 22 is mechanically controlled as the door opens and closes by extendable link devices. A first link device 50 is pivotally attached at a first end 52 to the fixed panel 24 and at a second end 54 to the support arm 42. A second link device 60 is pivotally attached at a first end 62 to the door 22 and at a second end 64 to the support arm 42. The respective lengths of the first and second link devices (50,60) vary as the support arm 42 deploys and stows, reaching their maximum lengths at deployment (FIGS. 1A-1B) and their minimum lengths at stowage (FIG. 2).

In the stowed condition (FIG. 2), the support arm 42 and door 22 are approximately parallel to the fixed panel 24. As the door 22 is opened, the second link device 60 pulls the support arm 42 from the stowed position proximal the fixed panel 24. The balance of the opposing forces of the first link device 50 and the second link device 60 upon the support arm 42 determines the deployment position of the support arm 42. Each link device 50 and 60 may be a gas cylinder and piston device that damps motion to minimize swinging of the door 22.

A traveling bracket 70 is fixedly mounted on and supported by the second end 48 of the support arm 42. Two hanger arms, referenced as a first hanger arm 72 and a second hanger arm 82, are pivotally connected to laterally spaced respective pivot points 74 and 84 (FIG. 4) of the traveling bracket 70, and are thereby pivotally attached to the second end 48 of the support arm 42 by way of the traveling bracket 70. The two hanger arms 72 and 82 travel with the traveling bracket 70 and pivot at the pivot points 74 and 84 as the hanger mechanism 40 deploys and stows. As the support arm 42 pivots toward the deployed position (FIG. 1A): the first hanger arm 72 pivots away from the support arm 42 and approximately toward the fixed panel 24 and into the cabinet 20; and the second hanger arm 82 pivots away from the support arm 42 and approximately toward the door 22 and out of the cabinet 20. In the deployed condition of the hanger mechanism 40 (FIG. 1A), the hanger arms 72 and 82 are deployed to their deployed positions extending outward from the traveling bracket 70 and outward from opposite sides of the support arm 42 in approximate opposite directions relative to each other to support a hanging garment such as a coat (not shown).

In the stowed condition of the hanger mechanism 40 (FIG. 2), the hanger arms 72 and 82 are folded to their stowed positions at which they extend from the traveling bracket 70 toward the first end 46 of the support arm 42 and pivot point 36, adjacent the support arm 42 along opposite lateral sides thereof. From an overhead perspective, and in the stowed condition, (FIG. 2), a first hanger arm 72 is stowed approximately between the support arm 42 and the fixed panel 24, and the second hanger arm 82 is stowed approximately between the support arm 42 and the door 22.

Figure 4:
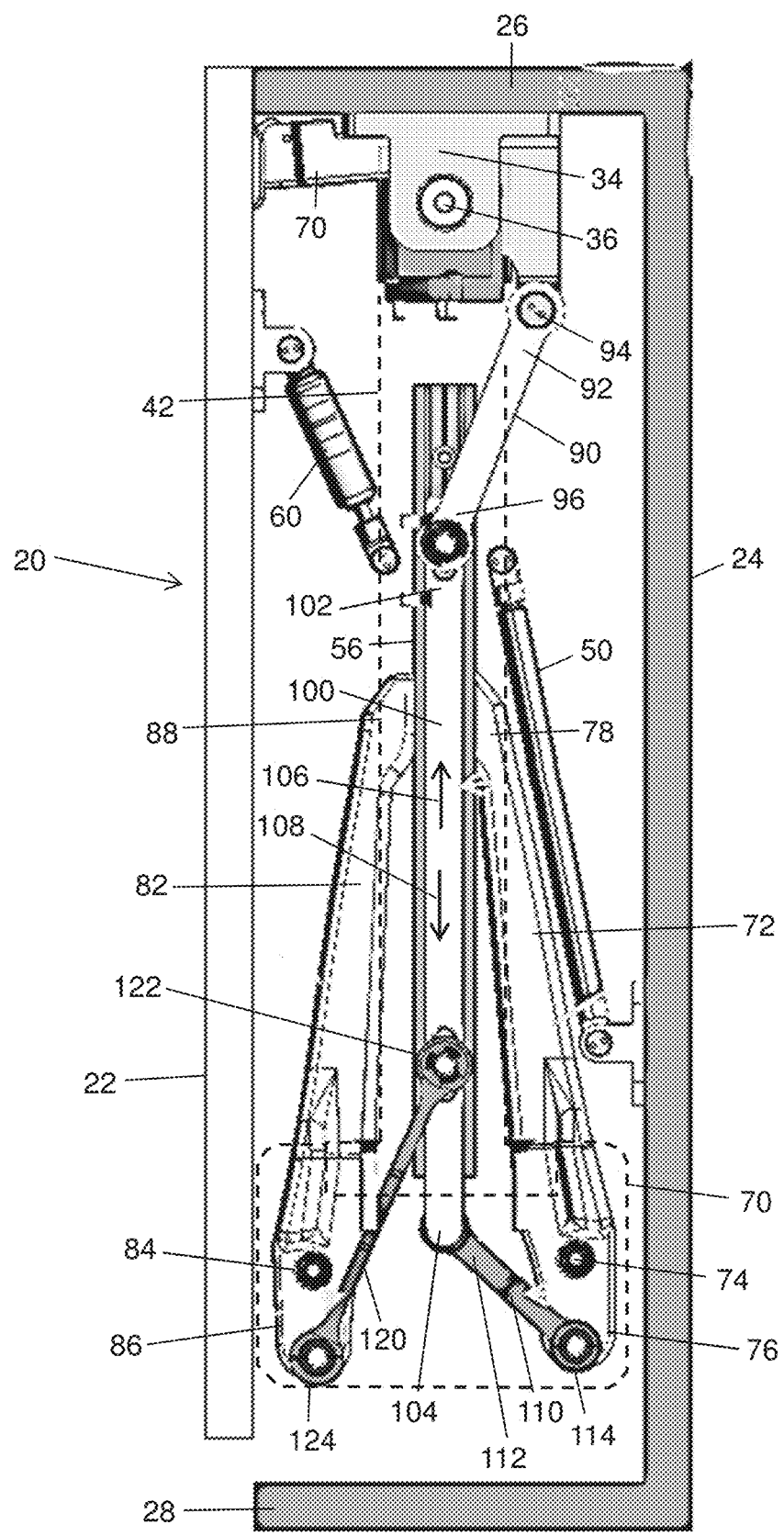
FIG. 4 is an overhead view of certain components the hanger mechanism in the stowed condition of FIG. 2, shown for illustration of internal features by which the hanger mechanism articulates hanger arms.

As shown in FIG. 4, each hanger arm (72,82) has a respective proximal end (76,86), and an opposite respective distal end (78,88). The distal ends serves as a garment supports in the deployed condition (FIG. 1A), for example at the shoulder of a hung garment. Each proximal end (76,86) extends beyond the respective pivot point (74,84) relative to the distal end, such that the pivot point serves as a fulcrum between the proximal end (76,86) and the distal end (78,88) of the hanger arm (72,82). The proximal ends (76,86) are operatively coupled to the support arm 42 to facilitate articulation of the hanger arms (72,82) as the support arm 42 pivots.

Links automatically articulate the hanger arms between their stowed and deployed positions as the support arm 42 pivots about the pivot point 36. Each of four links is illustrated as an inextensible rigid linear bar with two ends, each pivotally attached to a respective pivot point. FIG. 4 shows the links and certain other components of the hanger mechanism 40 for illustration purposes without the support arm 42 and traveling bracket 70, which are represented in dashed line for reference.

A drive link 90 (FIG. 4) has a first end 92 pivotally attached to a pivot point 94 of the support bracket 34. A second end 96 of the drive link 90, opposite the first end 92, is pivotally attached to a proximal end 102 of a transfer link 100 that is slidably coupled to the support arm 42 by a rail 56. The support arm is shown in FIG. 4 for illustration of, for example, the transfer link 90 and rail 56. The components illustrated in FIG. 4 are shown in their accurate relative positions for the stowed condition of the hanger mechanism. The rail 56 is fixedly connected to and carried by the support arm 42. The transfer link 100 is movable along the rail 56 and is maintained parallel to the support arm 42 throughout movements of the hanger mechanism 40 by the rail 56.

The pivot point 94 of the support bracket 34, to which the first end 92 of the drive link 90 is pivotally attached, is spaced or offset laterally from the pivot point 36 of the support bracket, to which the first end 46 of the support arm 42 is pivotally attached. By this arrangement, as the support arm 42 pivots, the drive link 90 causes the transfer link 100 to move linearly relative to the pivoting support arm 42 by translating longitudinally along the support arm 42.

To facilitate articulation of the first hanger arm 72, a first coupling link 110 has a first end 112 pivotally attached to the transfer link 100. The second end 114 of the first coupling link 110, opposite the first end 112, is pivotally attached to the proximal end 76 of the first hanger arm 72. To facilitate articulation of the second hanger arm 82, a second coupling link 120 has a first end 122 pivotally attached to the transfer link 100. A second end 124 of the second coupling link 120 is pivotally attached to the proximal end 86 of the second hanger arm 82. To automatically coordinate the respective positions of the hanger arms (72,82) with the position of the support arm 42, the coupling links (110,120) are operatively coupled with the support bracket 34 by way of the drive link 90 and transfer link 100, and coupled therefor with the sidewall 26 further by way of the support bracket 34.

To deploy the hanger mechanism, the door 22 can be opened by hand from the closed position of FIG. 2 toward the open position of FIGS. 1A-1B. As the door is opened, the second link device 60 pulls the support arm 42 to pivot outward from the fixed panel 24. As the support arm 42 pivots outward from the cabinet 20, the drive link 90 pulls the transfer link 100 to translate longitudinally in a first or rearward direction 106 along the pivoting support arm 42 toward the support bracket 34. The transfer link 100 actuates, by pulling, the first and second couplings links (110, 120), which actuate, by pulling, the proximal ends (76,86) of the hanger arms (72,92) thereby deploying the hanger mechanism 40 to extend the hanger arms (72,82) laterally.

To return the hanger mechanism to the stowed condition of FIGS. 2 and 4, the door 22 can be closed by hand. As the door is closed, the balance of opposing forces applied by the first link device 50 and the second link device 60 upon the support arm 42 pivot the support arm toward the stowed position of FIG. 4. As the support arm 42 pivots into the cabinet 20, the drive link 90 pushes the transfer link 100 to translate longitudinally in a second or forward direction 108 along the pivoting support arm 42 opposite the rearward direction 106, thereby stowing the hanger mechanism 40 and folding the hanger arms (72,82) toward the support arm.

The relative rates of deployment of the articulating elements of the hanger mechanism 40 are predetermined by the lengths of the links. The length of the first coupling link 110 and the location along the transfer link 100 at which the first end 112 of the first coupling link 110 is pivotally attached to the transfer link 100 predetermines the relative rate of deployment of the first hanger arm 72. The length of the second coupling link 120 and the location along the transfer link 100 at which the first end 122 of the second coupling link 120 is pivotally attached to the transfer link 100 predetermines the relative rate of deployment of the second hanger arm 72.

Figure 3:
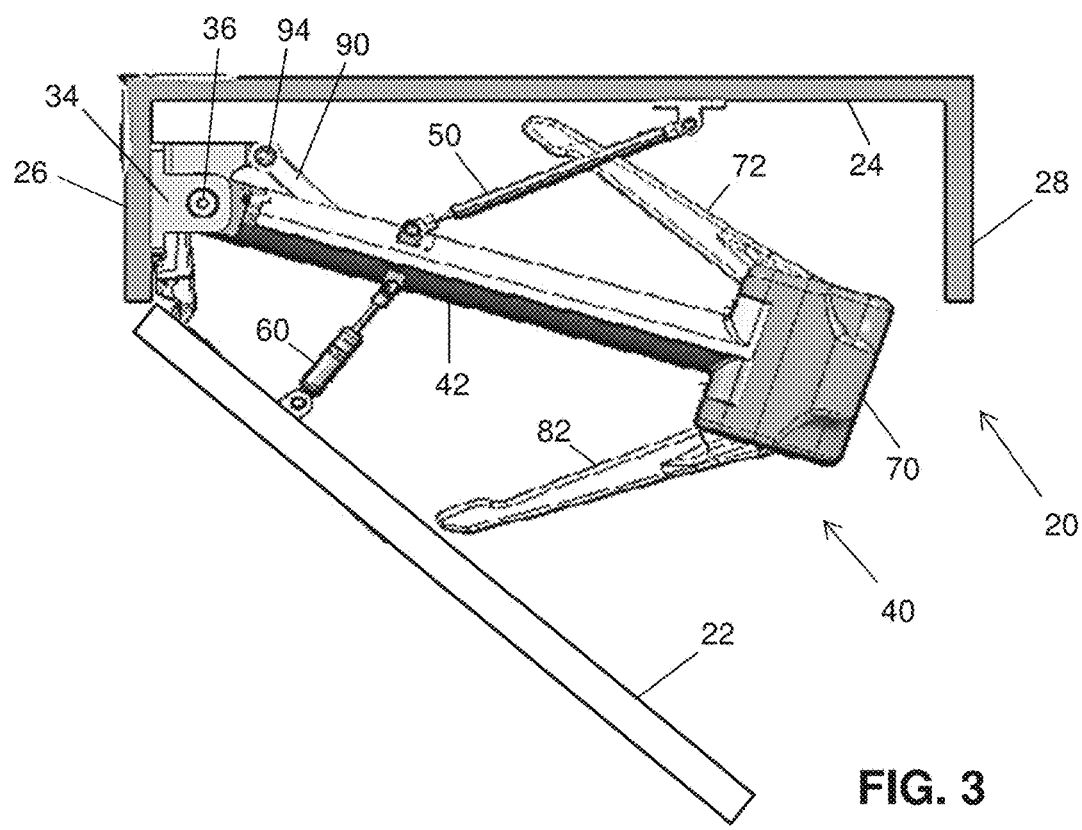
FIG. 3 is an overhead view of the hanger mechanism in transition from the stowed condition of FIG. 2 to the deployed condition of FIG. 1A.

By the illustrated example: the first coupling link 110 is relatively longer than the second coupling link 120; the first end 112 of the first coupling link 110 is pivotally attached to the distal end 104 of the transfer link 100 opposite the proximal end 102; and the first end 122 of the second coupling link 120 is pivotally attached to the transfer link 100 at a point longitudinally between the ends of the transfer link. By this arrangement, the first and second hanger arms 72 and 82 pivot at different rates of angular rotation relative to the support arm 42 as the support arm pivots. In the stowed position of the hanger mechanism 40 (FIGS. 2,4), the first hanger arm 72 is stowed proximal the fixed panel 24 and the second hanger arm is stowed proximal the door 22. The first hanger arm 72 should not strike the fixed panel 24 during deployment movements of the hanger mechanism 40, nor should the second hanger arm 82 strike the door 22. As the hanger mechanism deploys from the stowed position, through the partially deployed position (FIG. 3), to the deployed position (FIG. 1A), the door 22 swings outward at a greater rate than that of the support arm 42 according to the deployed position of the support arm 42 being between the door 22 and fixed panel 24. Thus, as shown in FIG. 3, the second hanger arm 82 can deploy at a greater rate than that of the first hanger arm 72 as the support arm 42 pivots. Accordingly, at deployment (FIG. 1A), the second hanger arm 82 is disposed at an approximate right angle B relative to the support arm 42, and the first hanger arm 72 is disposed at a lesser angle A relative to the support arm 42.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An articulating hanger mechanism comprising:
   a support arm pivotally attachable at a first end thereof to a first structure;
   at least one link device pivotally attached to the support arm and attachable to a second structure, the second structure pivotally connected to the first structure and defining therewith an enclosure in a closed position of the second structure relative to the first structure;
   first and second hanger arms pivotally attached to a second end of the support arm, the first and second hanger arms having stowed positions at which the first and second hanger arms extend toward the first end of the support arm along two opposite sides thereof; and
   first and second coupling links pivotally attached to the first and second hanger arms respectively for pivoting the first and second hanger arms from the stowed positions thereof to deployed positions at which the first and second hanger arms extend outward from the two opposite sides of the support arm to support a garment,
   wherein, upon user action pivoting the second structure from the closed position thereof, the link device automatically pivots the support arm outward from the enclosure and the first and second coupling links pivot the first and second hanger arms from the stowed positions thereof to the deployed positions thereof.

2. The articulating hanger mechanism of claim 1, wherein upon user action pivoting the second structure from an open position to the closed position thereof, the support arm automatically pivots into the enclosure and the first and second coupling links pivot the first and second hanger arms from the deployed positions thereof to the stowed positions thereof.

3. The articulating hanger mechanism of claim 2, further comprising a second link device pivotally attached to the support arm and attachable to the first structure, wherein the at least one link device and second link device are pivotally attached to opposite lateral sides of the support arm.

4. The articulating hanger mechanism of claim 1, further comprising a transfer link to which the first and second coupling links are pivotally attached, wherein the transfer link is slidably coupled to the support arm such that, as the link device pivots the support arm outward, the transfer link automatically translates along the support arm thereby actuating the first and second coupling links to pivot the first and second hanger arms from the stowed positions thereof to the deployed positions thereof.

5. The articulating hanger mechanism of claim 4, wherein, as the link device pivots the support arm outward, the transfer link automatically translates in a first direction along the support arm; and upon user action pivoting the second structure from an open position to the closed position thereof:
   the support arm automatically pivots into the enclosure; and
   the transfer link automatically translates in a second direction, opposite the first direction, along the support arm thereby actuating the first and second coupling links to pivot the first and second hanger arms from the deployed positions thereof to the stowed positions thereof.

6. The articulating hanger mechanism of claim 4, further comprising a drive link having a first end pivotally attachable to the first structure and a second end pivotally attached to the transfer link, wherein, upon user action pivoting the second structure from the closed position thereof, the drive link automatically pulls the transfer link to translate along the support arm.

7. The articulating hanger mechanism of claim 6, further comprising a support bracket attachable to the first structure, wherein the support arm is pivotally attached at the first end thereof to the support bracket, and, the first end of the drive link is pivotally attached to the support bracket.

8. The articulating hanger mechanism of claim 7, wherein the first end of the support arm is pivotally attached to the support bracket at a pivot point spaced from a pivot point at which the first end of the drive link is pivotally attached to the support bracket.

9. The articulating hanger mechanism of claim 1, wherein the first and second hanger arms pivot at different rates of angular rotation relative to the support arm as the support arm pivots.

10. The articulating hanger mechanism of claim 9, wherein first and second coupling links have fixed different lengths thereby pivoting the first and second hanger arms at the different rates of angular rotation relative to the support arm as the support arm pivots.

11. A wardrobe comprising:
a cabinet comprising at least a rear wall and a sidewall;
a door pivotally attached to the sidewall and defining, with at least the sidewall and rear wall, an enclosure in a closed position of the door; and
an articulating hanger mechanism comprising:
  a support arm pivotally attached at a first end thereof to the sidewall;
  at least one link device having a first end pivotally attached to the door and a second end pivotally attached to the support arm;
  first and second hanger arms pivotally attached to a second end of the support arm, the first and second hanger arms having stowed positions at which the first and second hanger arms extend toward the first end of the support arm along two opposite sides thereof; and
  first and second coupling links pivotally attached to the first and second hanger arms respectively for pivoting the first and second hanger arms from the stowed positions thereof to deployed positions at which the first and second hanger arms extend outward from the two opposite sides of the support arm to support a garment,
wherein, upon user action pivoting the door from the closed position thereof, the link device automatically pivots the support arm outward from the enclosure and the first and second coupling links pivot the first and second hanger arms from the stowed positions thereof to the deployed positions thereof.

12. The wardrobe of claim 11, wherein upon user action pivoting the door from an open position to the closed position thereof, the support arm automatically pivots into the enclosure and the first and second coupling links pivot the first and second hanger arms from the deployed positions thereof to the stowed positions thereof.

13. The wardrobe of claim 12, further comprising a second link device having a first end pivotally attached to the rear wall and a second end pivotally attached to the support arm, wherein the second ends of the at least one link device and second link device are pivotally attached to opposite lateral sides of the support arm.

14. The wardrobe of claim 11, further comprising a transfer link to which the first and second coupling links are pivotally attached, wherein the transfer link is slidably coupled to the support arm such that, as the link device pivots the support arm outward, the transfer link automatically translates along the support arm thereby actuating the first and second coupling links to pivot the first and second hanger arms from the stowed positions thereof to the deployed positions thereof.

15. The wardrobe of claim 14, wherein, as the link device pivots the support arm outward, the transfer link automatically translates in a first direction along the support arm; and upon user action pivoting the door from an open position to the closed position thereof:
  the support arm automatically pivots into the enclosure; and
  the transfer link automatically translates in a second direction, opposite the first direction, along the support arm thereby actuating the first and second coupling links to pivot the first and second hanger arms from the deployed positions thereof to the stowed positions thereof.

16. The wardrobe of claim 14, further comprising a drive link having a first end pivotally attached to the sidewall and a second end pivotally attached to the transfer link, wherein, upon user action pivoting the door from the closed position thereof, the drive link automatically pulls the transfer link to translate along the support arm.

17. The wardrobe of claim 16, further comprising a support bracket attached to the sidewall, wherein the support arm is pivotally attached at the first end thereof to the support bracket, and, the first end of the drive link is pivotally attached to the support bracket.

18. The wardrobe of claim 17, wherein the first end of the support arm is pivotally attached to the support bracket at a pivot point spaced from a pivot point at which the first end of the drive link is pivotally attached to the support bracket.

19. The wardrobe of claim 11, wherein the first and second hanger arms pivot at different rates of angular rotation relative to the support arm as the support arm pivots.

20. The wardrobe of claim 19, wherein the first and second coupling links have fixed different lengths thereby pivoting the first and second hanger arms at the different rates of angular rotation relative to the support arm as the support arm pivots.

* * * * *